United States Patent
Porat et al.

(10) Patent No.: US 7,574,555 B2
(45) Date of Patent: Aug. 11, 2009

(54) MEMORY SYSTEM HAVING DAISY CHAINED MEMORY CONTROLLERS

(75) Inventors: Ofer Porat, Westborough, MA (US); Brian K. Campbell, Cedar Park, TX (US); Brian D. Magnuson, Somerville, MA (US); Stephen Scaringella, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 383 days.

(21) Appl. No.: 11/083,571

(22) Filed: Mar. 18, 2005

(65) Prior Publication Data

US 2006/0212622 A1  Sep. 21, 2006

(51) Int. Cl.
*G06F 12/00* (2006.01)
*G06F 12/02* (2006.01)
*G06F 13/00* (2006.01)
*G06F 13/28* (2006.01)

(52) U.S. Cl. .......................................... 711/105; 711/1
(58) Field of Classification Search ....................... 711/5
See application file for complete search history.

(56) References Cited

U.S. PATENT DOCUMENTS 5,381,419 A * 1/1995 Zorian ........................ 714/720
5,860,080 A * 1/1999 James et al. ..................... 711/4
6,067,596 A * 5/2000 Nguyen et al. ............... 710/306
6,272,567 B1* 8/2001 Pal et al. ........................ 701/56
2002/0083270 A1* 6/2002 Chilton ....................... 711/130
2002/0152355 A1* 10/2002 Otterness et al. ............. 711/114
2005/0044304 A1* 2/2005 James ........................ 711/105
2005/0071556 A1* 3/2005 Walton et al. ................ 711/114
2006/0047990 A1* 3/2006 James et al. ................. 713/400

OTHER PUBLICATIONS

Charles Kozierok, The Memory Controller, Aug. 2000, Printed from http://web.archive.org/web/20000817085955/http://www.pcguide.com/ref/ram/timingController-c.html, 1 page.*
Wikipedia, Daisy Chain (electrical engineering), retrieved from http://en.wikipedia.org/wiki/Daisy_chain_(electrical_engineering) on Apr. 30, 2009, 3 pages.*
"Fully Buffered DIMM (FB-DIMM) Server Memory Architecture"; by Pete Vogt, Principal Engineer, Intel Corp., Feb. 18, 2004, Intel Developer Forum.

* cited by examiner

*Primary Examiner*—Hyung S Sough
*Assistant Examiner*—Gary W Cygiel

(57) ABSTRACT

A memory system having a plurality of sets of memory modules. The system includes a plurality of sets of memory controllers, each one of the memory controllers being coupled to a corresponding one of the plurality of sets of memory modules. The system includes a port for providing address and read/write control signals to the memory system. The memory controllers are interconnected in a daisy chain arrangement to the port.

2 Claims, 8 Drawing Sheets

MEMORY SYSTEM HAVING DAISY CHAINED MEMORY CONTROLLERS

TECHNICAL FIELD

This invention relates generally to memory systems and more particularly to memory controller arrangements used in such memory systems.

BACKGROUND

As is known in the art, one type of memory system includes a memory controller that drives a set of Dual In-Line Memory Modules (DIMMs). One type of DIMM arrangement is a fully buffered DIMM (FB-DIMM) wherein the DRAM devices are buffered behind one or more buffer devices. The arrangement is shown in FIG. 1. The FB-DIMM channel uses a daisy-chain topology to provide expansion from a single DIMM per channel to up to 8 DIMMs per channel. The memory controller sends data on to the first DIMM where it is received and re-driven to the second DIMM. Each DIMM receives the data and again re-drives the data to the next DIMM until the last DIMM receives the data. The targeted DIMM then initiates the transmission of data in the opposite direction of the memory controller. As is also known in the art, many applications require low latency with greater than eight memory modules. Further, with the FB-DIMM arrangement, the memory controllers have only limited memory operation and therefore are not able to perform operations such as, atomic operations, e.g., a read-modify-write operation wherein data is to be read, modified, and written back into the memory before such read data is operated on by some other command, unless a separate "controller" chip is provided.

SUMMARY

In accordance with the present invention, a memory system is provided having a plurality of sets of memory modules. The system includes a plurality of memory controllers, each one of the memory controllers being coupled to a corresponding one of the plurality of sets of memory modules. The system includes a port for providing address and read/write control signals to the memory system. The memory controllers are interconnected in a daisy chain arrangement to the port.

In one embodiment, a data storage system is provided having an interface for coupling a host computer/server to a bank of disk drives. The interface includes a pair of packet switching networks, each one being coupled to front end controllers, back end controllers and a cache memory. The cache memory includes a pair of bi-directional ports, each one being connected to a corresponding one of the pair of redundant packet switching networks, each one of the ports providing address and read/write control signals to the memory system. The memory system includes a plurality of sets of memory modules and a plurality of sets of memory controllers, each one of the memory controllers being coupled to a corresponding one of the plurality of sets of memory modules. The memory controllers are interconnected in a daisy chain arrangement to the ports.

In one embodiment, a memory system is provided having a plurality of sets of memory modules. The memory system includes a plurality of memory controllers, each one of the memory controllers being coupled to a corresponding one of the plurality of sets of memory modules. A port provides address and read/write control signals to the memory system. Each one of the memory controllers receives the memory address and read/write control signals, compares the address signal with addresses of one of the sets of memory modules coupled thereto, and either addresses such one of the coupled sets of memory modules when the received address corresponds to the addresses of one of the sets of memory modules coupled thereto or passes such address and read/write control signals to a successively coupled one of the plurality of memory controllers when the received address fails to correspond to the addresses of one of the sets of memory modules coupled thereto.

In one embodiment, each one of the memory controllers includes an encoder/decoder coupled to the port for converting the address and control signals at the port to address and control signals for the set of memory modules coupled to such one of the memory controllers.

In one embodiment, each one of the memory modules includes a second encoder/decoder and wherein each one of the memory modules includes a second encoder/decoder and wherein the passed memory module address and control signals and re-converted into the address and read/write control signals and then passed through the second one of the decoder/decodes to the successively coupled one of the plurality of memory controllers when the received address fails to correspond to the addresses of one of the sets of memory modules coupled thereto.

With such an arrangement, more than eight memory modules may be used. Further, full memory operation functionality (e.g., read modify write atomic operation) is on the memory controller without the need for a separate "mother" chip.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
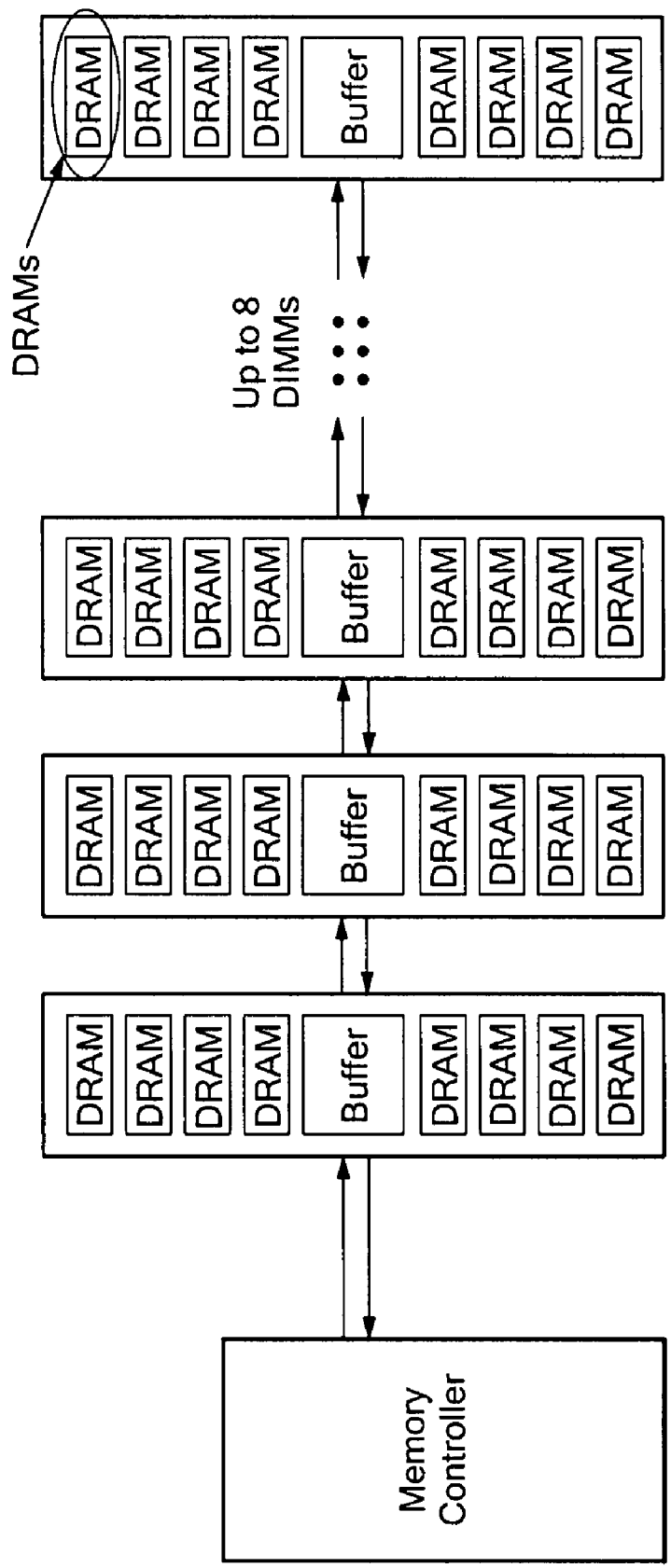
FIG. 1 is a diagram of a memory system according to the PRIOR ART.
Figure 2:
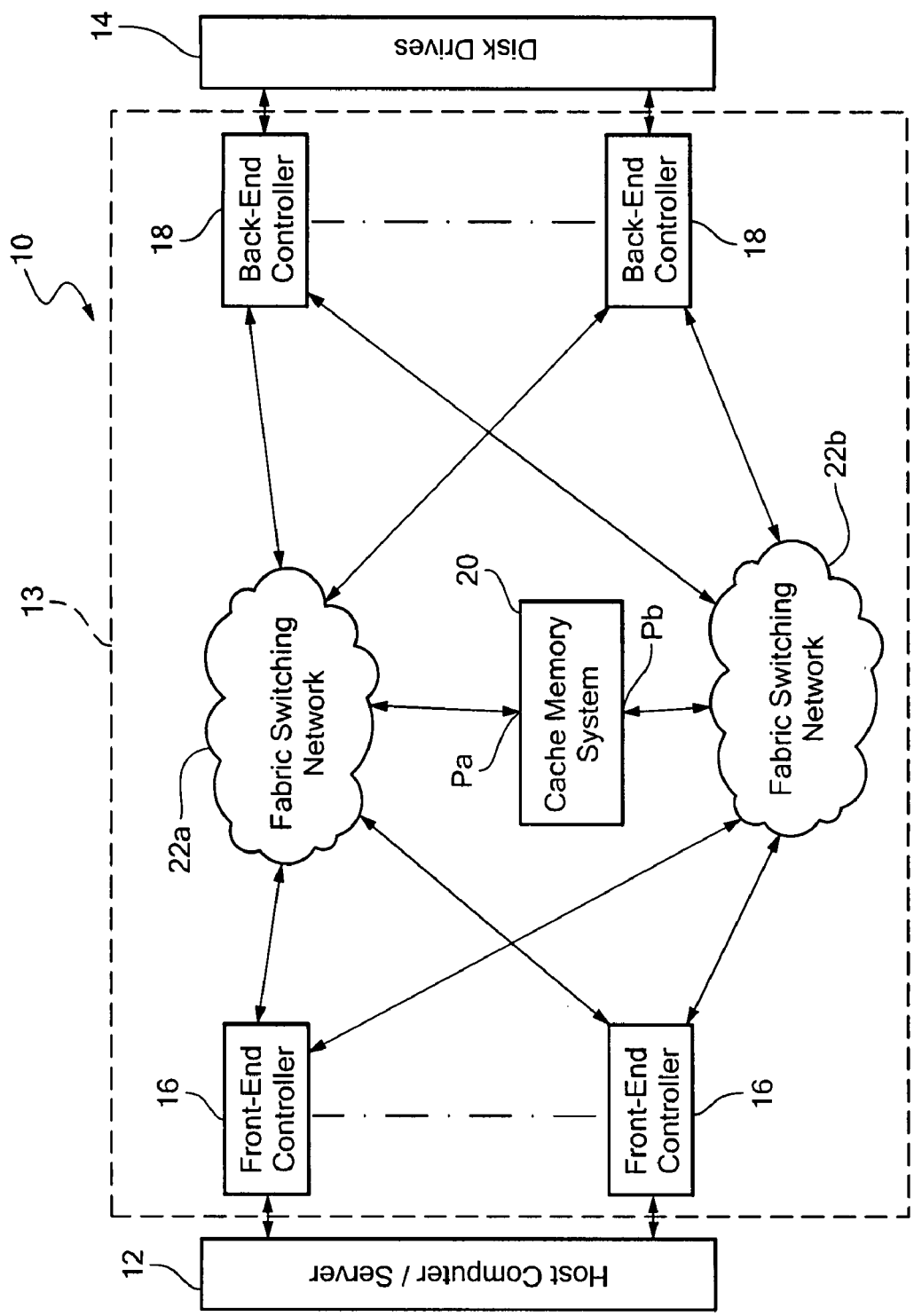
FIG. 2 is a data storage system according to the invention.

Referring now to FIG. 2, a data storage system 10 is shown having a host computer/server 12 coupled to a bank of disk drives 14 through a system interface 13. The system interface 13 includes a plurality of front-end controllers 16 coupled to the host computer/server 12 and a plurality of back end controllers 18 coupled to the bank of disk drives 14. The interface 13 includes a cache memory system 20. The front-end controllers 16, back end controllers 18 and cache memory system 20 are interconnected by a pair of redundant packet switching networks 22a, 22b, reference being made to copending patent application entitled "Data Storage System Packet Switching Network", inventors John K. Walton et al., Ser. No. 10/675,038, filed Sep. 30, 2003, assigned to the same assignee as the present invention, the entire subject matter thereof being incorporated herein by reference. It is noted that the cache memory has a pair of redundant ports Pa and Pb, each one being connected to a corresponding one of the pair of redundant packet switching networks 22a, 22b, as shown.

Figure 3:
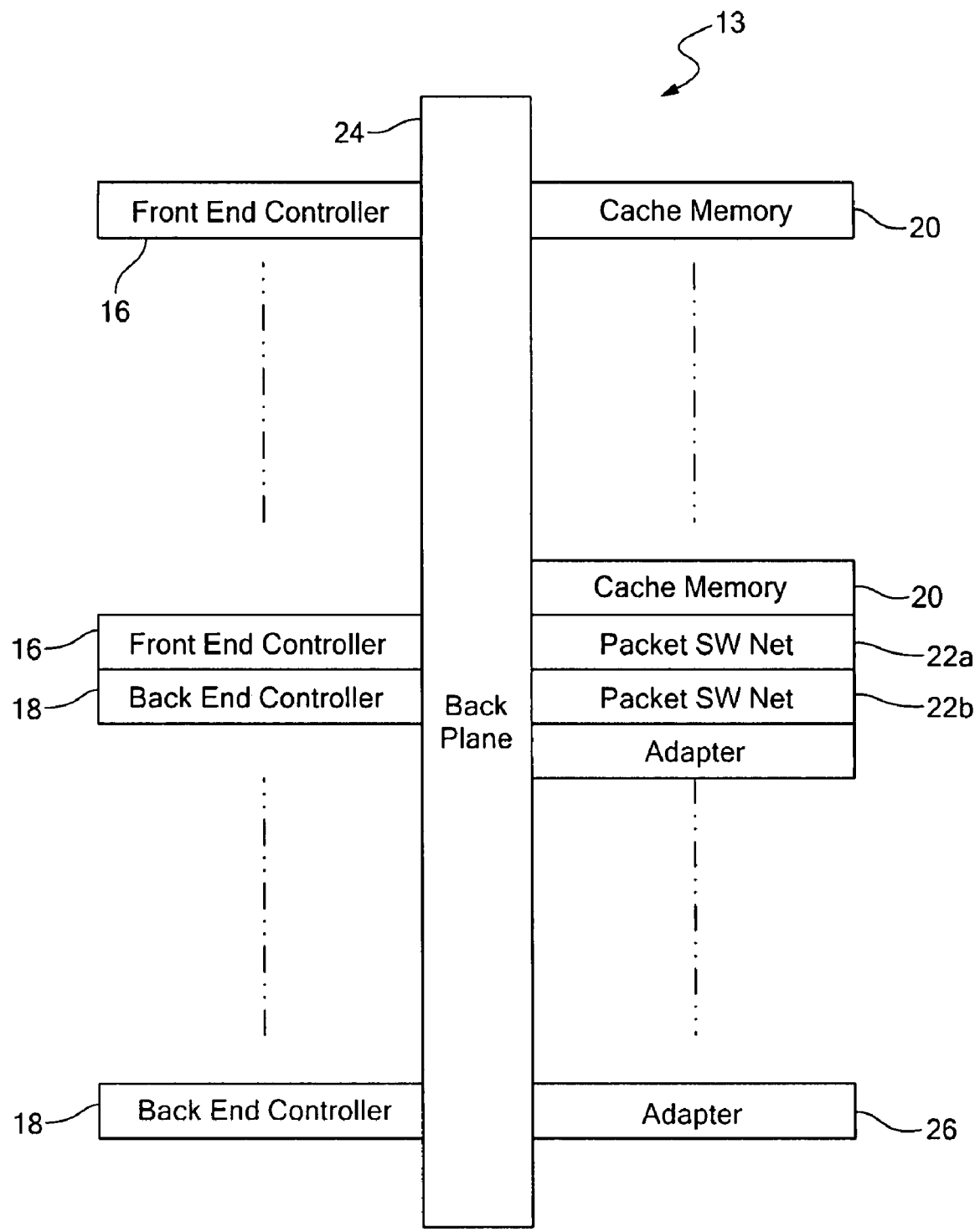
FIG. 3 is a diagram of a system interface used in the data storage system of FIG. 2.

Referring now to FIG. 3, the system interface 13 is shown having a backplane 24. The backplane 24 interconnects the plurality of front-end controllers 16, the plurality of back end controllers 18, the memory system 20. The front-end controllers 16, back end controllers 18 and cache memory 20, the pair of redundant packet switching networks 22a, 22b all being mounted on printed circuit boards which plug into the backplane 24. Also plugged into the backplane 24 are front end and back end adapters 26 for interfacing to the host computer/server 12 and bank of disk drives 14, respectively.

Figure 4:
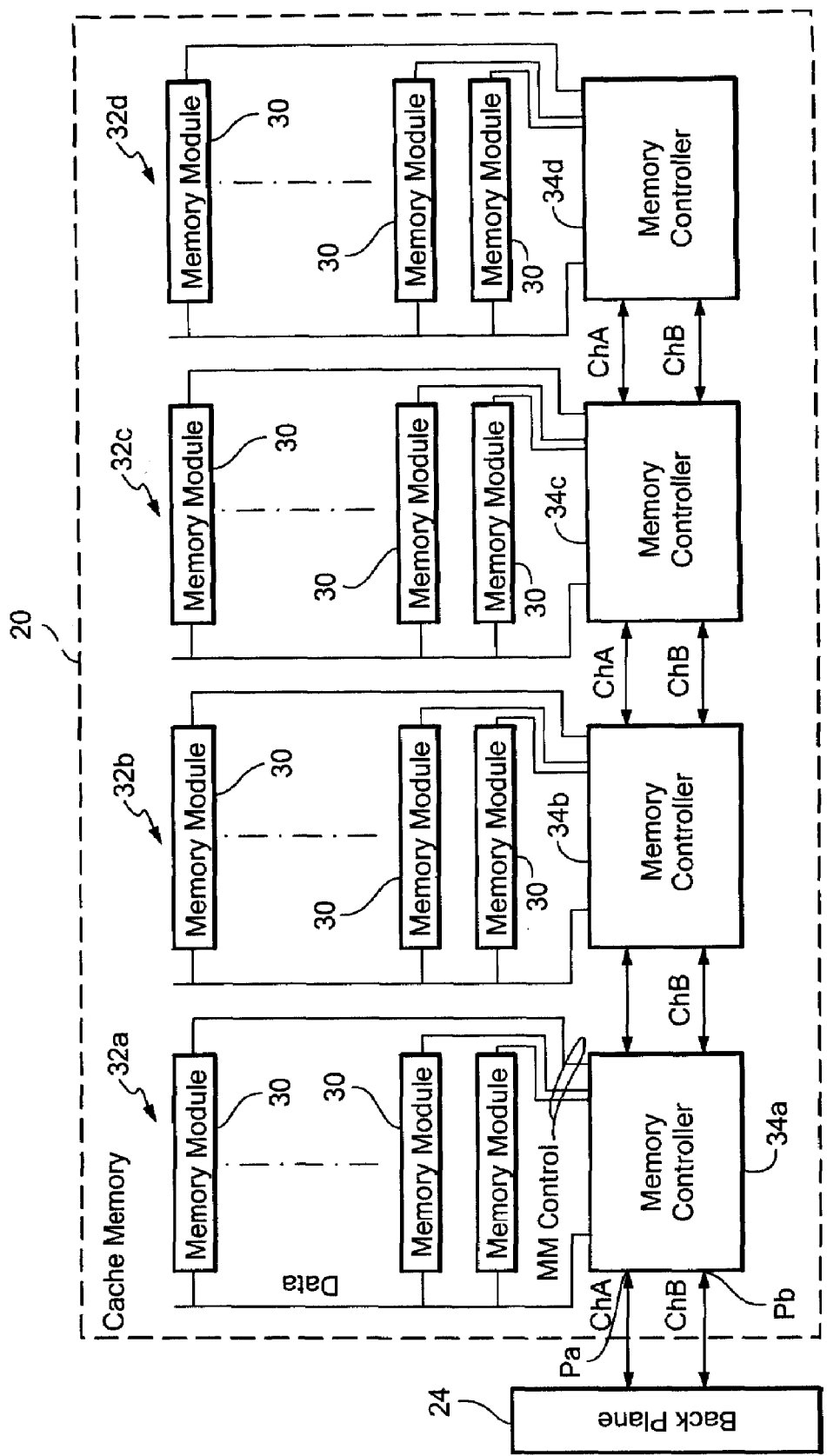
FIG. 4 is a diagram of a memory system used in the system interface of FIG. 3 according to the invention.

Referring now to FIG. 4, an exemplary one of the memory printed circuit boards having a portion of the cache memory system 20 thereon is shown having the port Pa and port Pb thereof connected to the backplane 24. The memory system 20 includes a plurality of, here for example four sets 32a-32d of memory modules 30, respectively. Each one of the sets 32a-32d of memory modules 30 is coupled to a corresponding one of a plurality of memory controllers 34a-34d, respectively, as shown. The memory controllers 34a-34d are interconnected to the pair of ports, Pa, Pb in a daisy chain arrangement as shown. More particularly, as will be described, data for fabric switching network 22a (FIG. 2) passes in a daisy chain through a channel labeled ChA while data for fabric switching network 22b (FIG. 2) passes in a daisy chain through a channel labeled ChB.

More particularly, each one of the memory controllers 34a-34d provides a data bus (DATA) and read/write, chip select, memory operational signals (e.g., Row Address Select (RAS), Column Address Select (CAS)) and memory module address signals, herein collectively referred to as memory module control signals on lines MM CONTROL to the plurality of memory modules 30 in the one of the sets 32a-32d coupled thereto, as shown. Here, for example, the memory modules 30 are double data rate random access memories (DDR2 RAMs) although other types of memory modules may be used.

Figure 5:
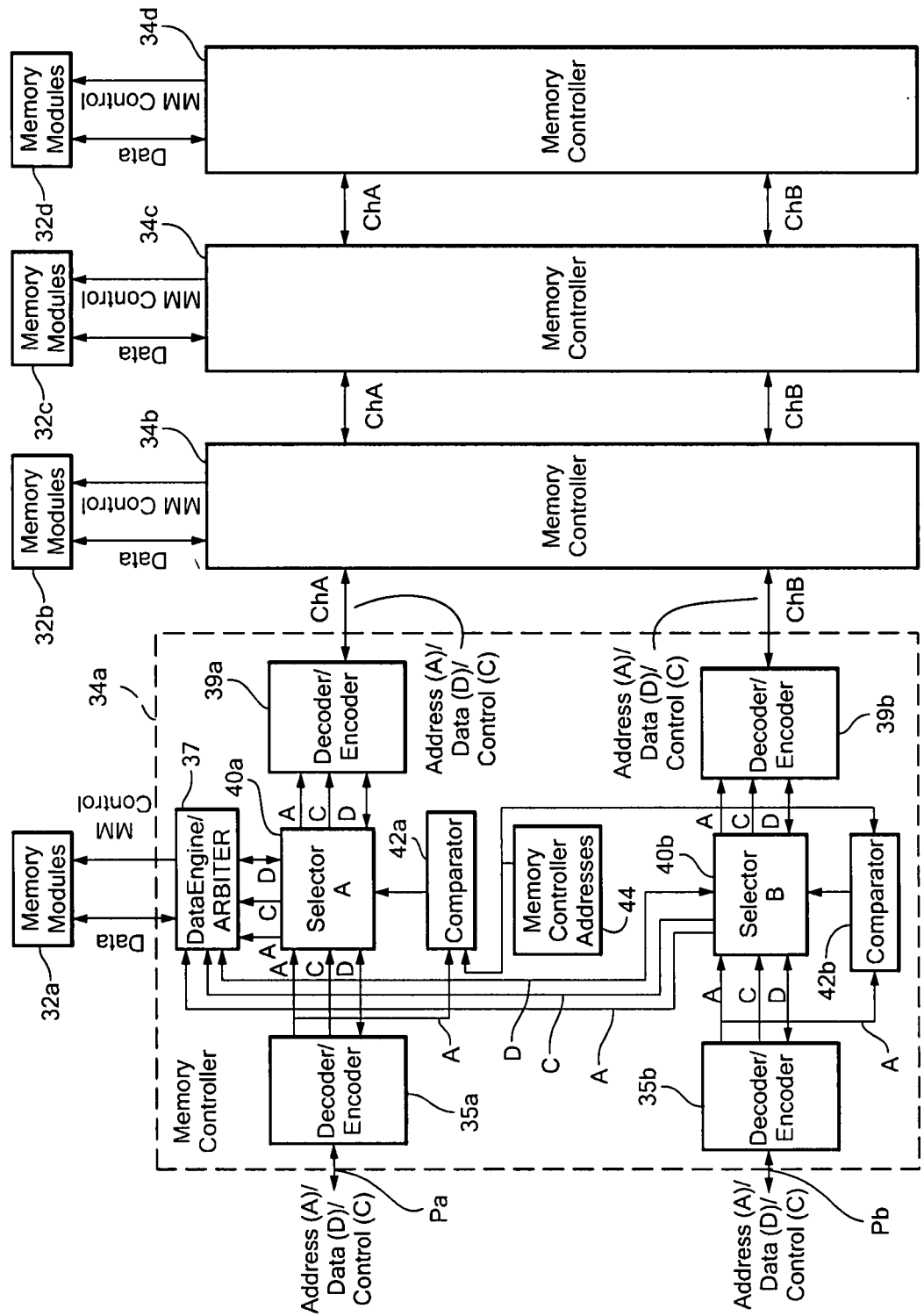
FIG. 5 is a diagram of the memory system of FIG. 4 showing in more detail an exemplary one of a plurality of daisy chained memory controllers used in such memory system according to the invention.

Referring now to FIG. 5, an exemplary one of the memory controllers 34a-34d, here memory controller 34a is shown in more detail to include a pair of encoder/decoders 35a, 35b, each one being connected to a corresponding one of the ports Pa, Pb, respectively. Each one of the decoder/encoders 35a, 35b converts cache memory system 20 data, address (A) and control (C) signals in the protocol at the port Pa, or Pb into address (A) and control (C) signals having the protocol used by the memory controller 34a. Data to be written into the memory system 20 or read from the memory system is provided on a data bus (D), as indicated. Each one of the pair of encoder/decoders 35a, 35b is connected to a corresponding one of a pair of selectors 40a, 40b, respectively, as indicated. Each one of the selectors 40a, 40b compares in a corresponding one of a pair of comparators 42a, 42b the memory system 20 address fed thereto with the set of addresses assigned to the set of memory modules 30 in set 32a stored in a register 44.

More particularly, because the memory module 34a is connected to a pair of ports Pa, Pb arbitration is required to determine which one of the ports Pa, Pb is to have access to the memory modules 30. Thus, each one of the selectors 40a, 40b is connected to a data engine/arbiter 37, as indicated. The data engine/arbiter 37 resolves any contention for the memory modules 34a using any desired arbitration algorithm. The data engine/arbiter 37 also converts the memory system 20 address and control signals into the memory module control signals for the lines, as well as performing any requested read modify write operations.

If the address is one of the addresses in the set 32a of memory modules 30 coupled thereto, the proper memory module 30 (FIG. 4) is selected by the proper chip select portion of the memory module control signals so that it has data on the data bus written into the proper memory module 30 in response to a write command portion of the memory module control signals or has data stored therein read therefrom and placed on the data bus in response to a read command portion of the memory module control signals fed thereto. During a read operation, the read data is returned to the proper one of the ports Pa, Pb.

On the other hand, if the address is not one of the addresses in the set 32a of memory modules 30 coupled thereto, the memory module control signals are passed through encoder/decoder 39a, for information at port Pa and through encoder/decoder 39b for information at port Pb wherein the address (A) and control (C) signals having the protocol used by the memory controller 34a are converted into cache memory system 20 address (A) and control (C) signals in the protocol at the port Pa, or Pb and passed to the next one of the memory controllers in the daisy chain, here memory controller 34b.

The process repeats for each one of the daisy chained sets 32b-32d of memory modules 30. Thus, it is noted that data for fabric switching network 22a (FIG. 2) pass through a channel labeled ChA while data for fabric switching network 22b (FIG. 2) pass through a channel labeled ChB.

Figure 6:
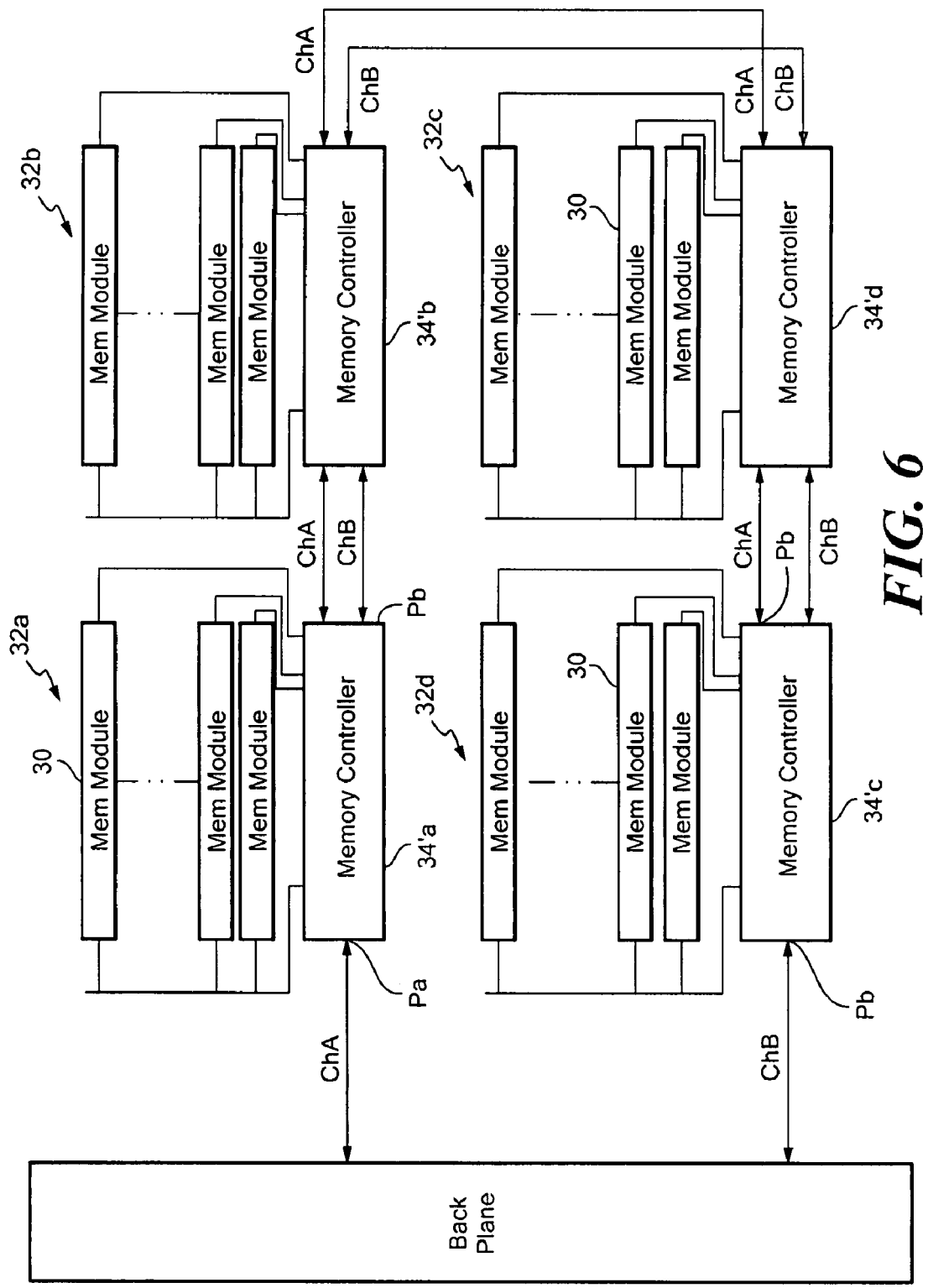
FIG. 6 is a diagram of a memory system used in the system interface of FIG. 3 according to an alternative embodiment of the invention.
Figure 6A:
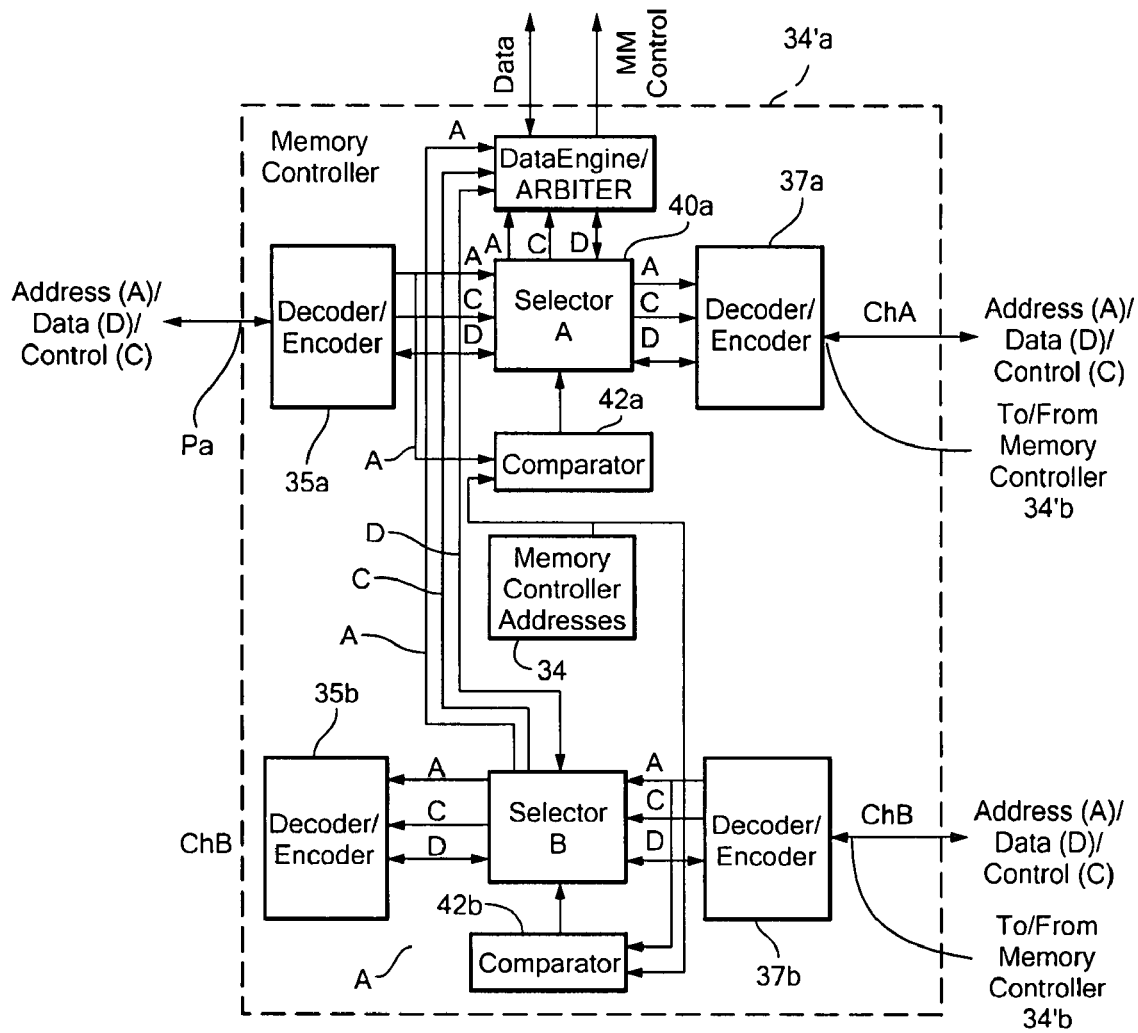
FIG. 6A is a diagram of an exemplary one of a plurality of daisy chained memory controllers used in the memory system of FIG. 6 according to the invention.
Figure 6B:
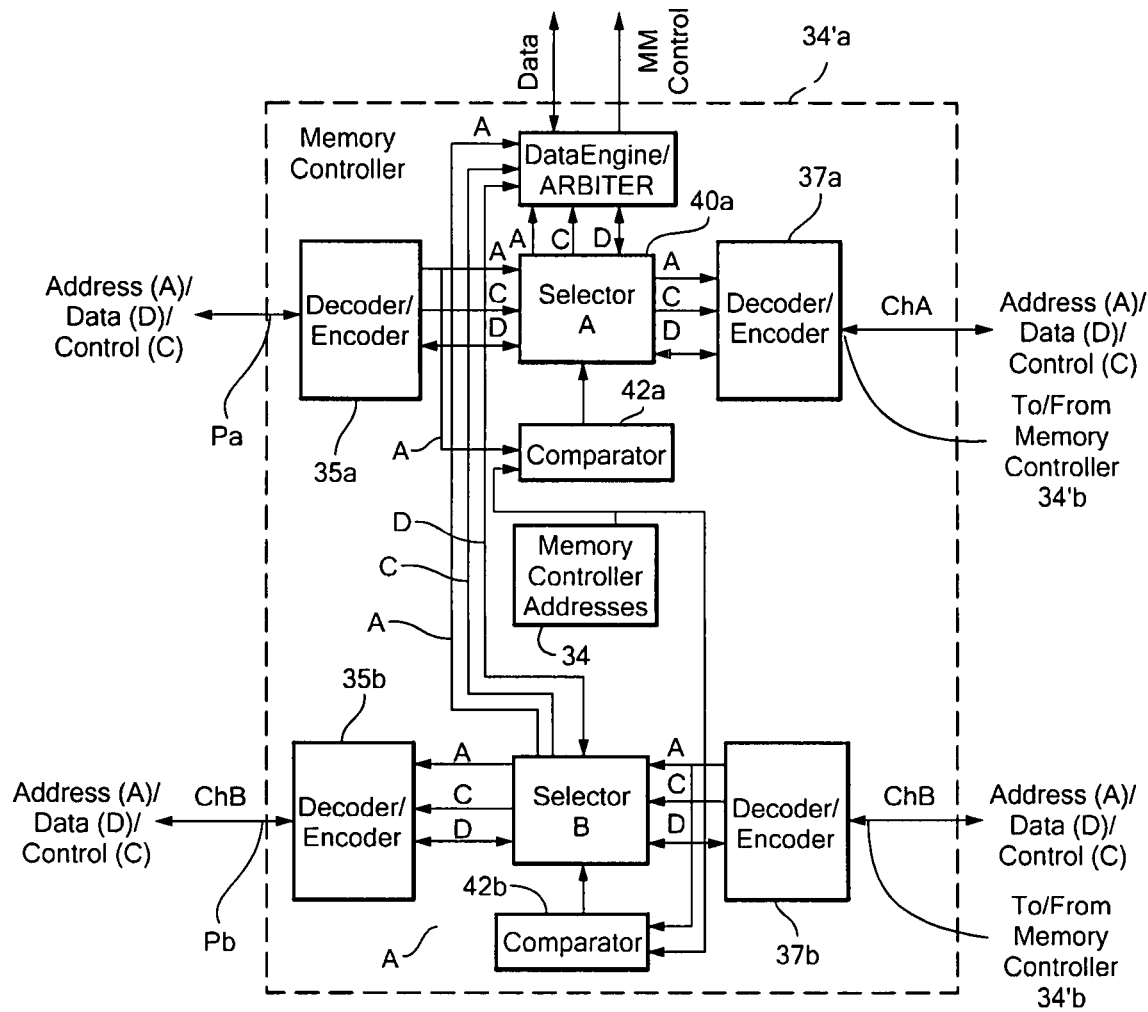
FIG. 6B is a diagram of another exemplary one of a plurality of daisy chained memory controllers used in the memory system of FIG. 6 according to the invention Like reference symbols in the various drawings indicate like elements.

Referring now to FIG. 6, an alternative embodiment of a cache memory system 20' is shown. The memory system 20' includes a plurality of, here for example four sets 32a-32d of memory modules, respectively. Each one of the sets 32a-32d of memory modules 30 is coupled to a corresponding one of a plurality of memory controllers 34'a-34'd, respectively, as shown. An exemplary of the memory controllers 34'a-34'd, here memory controller 34'a, is shown in FIG. 6A and memory controller 34'b is shown in FIG. 6B. The memory controllers 34'a-34'd are interconnected to the pair of ports, Pa, Pb in a daisy chain arrangement as shown.

More particularly, here memory controller 34'a is connected to port Pa and memory controller 34'd is connected to port Pb, they are daisy chained together through the other memory controllers 34'b-34'c. Here again, data for fabric switching network 22a (FIG. 2) passes in a daisy chain through a channel labeled ChA while data for fabric switching network 22b (FIG. 2) passes in a daisy chain through a channel labeled ChB.

More particularly, if port Pa is to access memory module set 32d, the address, control and data passes through memory controllers 34'a, 34'b, 34'c and 34'd via the channel labeled ChA. Likewise, if port Pb is to access memory module set 32a, the address, control and data passes through memory controllers 34'd, 34'c, 34'b and 34'a via the channel labeled ChB. It is noted that the encoder/decoder 35b in memory controller 34'a is not used and that the encoder/decoder 35a in memory controller 34'd is not used while the encoder/decoder 35b in memory controller 34'd is connected to port Pb. Here again, data for fabric switching network 22a (FIG. 2) passes in a daisy chain through a channel labeled ChA while data for fabric switching network 22b (FIG. 2) passes in a daisy chain through a channel labeled ChB.

A number of embodiments of the invention have been described. Nevertheless, it will be understood that various modifications may be made without departing from the spirit and scope of the invention. For example, while only four memory controllers are shown, the memory system may include more or less than four memory controllers. Accordingly, other embodiments are within the scope of the following claims.

What is claimed is:

1. A data storage system having an interface for coupling a host computer/server to a bank of disk drives, such interface having a pair of redundant packet switching networks, each one being coupled to front end controllers, back end controllers and a cache memory, such cache memory, comprising:
   a pair of bi-directional ports, each one being connected to a corresponding one of the pair of packet switching networks, each one of the ports providing address and read/write control signals to the memory system;
   a plurality of sets of memory modules;
   a plurality of memory controllers, each one of the memory controllers being coupled to a corresponding one of the plurality of sets of memory modules;
   wherein each one of the memory controllers includes an arbiter coupled to the corresponding one of the plurality of sets of memory modules, such arbiter being coupled to the pair of bi-directional ports to determine which one of the pair of bi-directional ports is to have access to the one of the sets of memory modules coupled to such one of the arbiters; and
   wherein the memory controllers are interconnected in a daisy chain arrangement to the ports, a first one of the memory controllers in the daisy chain being coupled to a first one of the pair of ports and a last one of the memory controllers in the daisy chain being coupled to a second one of the pair of ports; and
   wherein a signal path for the address and read/write control signals from the first one of the pair of ports through the controllers is in a direction opposite to a signal path for the address and read/write control signals from the second one of the pair of ports through the controllers.

2. A data storage system having an interface for coupling a host computer/server to a bank of disk drives, such interface having a pair of redundant packet switching networks, each one being coupled to front end controllers, back end controllers and a cache memory, such cache memory, comprising:
   a pair of bi-directional ports, each one being connected to a corresponding one of the pair of packet switching networks, each one of the ports providing address and read/write control signals to the memory system;
   a plurality of sets of memory modules;
   a plurality of memory controllers, each one of the memory controllers being coupled to a corresponding one of the plurality of sets of memory modules;
   wherein each one of the memory controllers receives the memory address and read/write control signals, compares the address signal with addresses of one of the sets of memory modules coupled thereto, and either addresses such one of the coupled sets of memory modules when the received address corresponds to the addresses of one of the sets of memory modules coupled thereto or passes such address and read/write control signals to a successively coupled one of the plurality of memory controllers when the received address fails to correspond to the addresses of one of the sets of memory modules coupled thereto;
   wherein each one of the memory controllers includes an arbiter coupled to the corresponding one of the plurality of sets of memory modules, such arbiter being coupled to the pair of bi-directional ports to determine which one of the pair of bi-directional ports is to have access to the one of the sets of memory modules coupled to such one of the arbiters;
   wherein the memory controllers are interconnected in a daisy chain arrangement, a first one of the memory controllers in the daisy chain being coupled to a first one of the pair of ports and a last one of the memory controllers in the daisy chain being coupled to a second one of the pair of ports; and
   wherein a signal path for the address and read/write control signals from the first one of the pair of ports through the controllers is in a direction opposite to a signal path for the address and read/write control signals from the second one of the pair of ports through the controllers.

* * * * *